July 17, 1923.

F. T. LYNCH

REFRIGERATOR

Filed Oct. 17, 1921

1,462,206

Francis T. Lynch INVENTOR.

BY

William W. Varney ATTORNEY.

Patented July 17, 1923.

1,462,206

UNITED STATES PATENT OFFICE.

FRANCIS T. LYNCH, OF BALTIMORE, MARYLAND.

REFRIGERATOR.

Application filed October 17, 1921. Serial No. 508,123.

*To all whom it may concern:*

Be it known that I, FRANCIS T. LYNCH, a citizen of the United States, residing at Baltimore city, in the State of Maryland, have invented a new and useful Refrigerator, of which the following is a specification.

The object of my invention is the providing of improved means of refrigeration or freezing.

A further object of my invention is the providing of a suitable refrigerator in which my improved means may be used.

A further object of my invention is the providing of a freezing chamber around which a brine of varying density may circulate.

A further object of my invention is the providing of a freezing chamber, the top of which is in contact with a soluble freezing mixture, the solution from which may be separated therefrom, and may circulate around the sides of said chamber.

With the foregoing and other objects in view, my invention consists of the novel construction and arrangement of parts as hereinafter specifically described and illustrated in the accompanying drawing, wherein is shown the preferred embodiment of my invention, but it is understood that changes, variations and modifications may be resorted to which come within the scope of the claims hereunto appended.

My invention differs from the ordinary ice cream freezer, in that, I separate the undissolved portions of the freezing compound, so called, from the dissolved portion. The latter I strain into a jacket around my freezing chamber. In this way I am enabled to maintain a uniform degree of melting, and liquid circulation around my freezing chamber without an undue lowering of temperature locally.

In the apparatus shown, with a mixture of salt and ice, I was enabled to obtain a uniform constant temperature of 10° F. with the ratio of mixture used, even when considerable new matter was introduced into the freezing chamber to be frozen.

Figure 1:
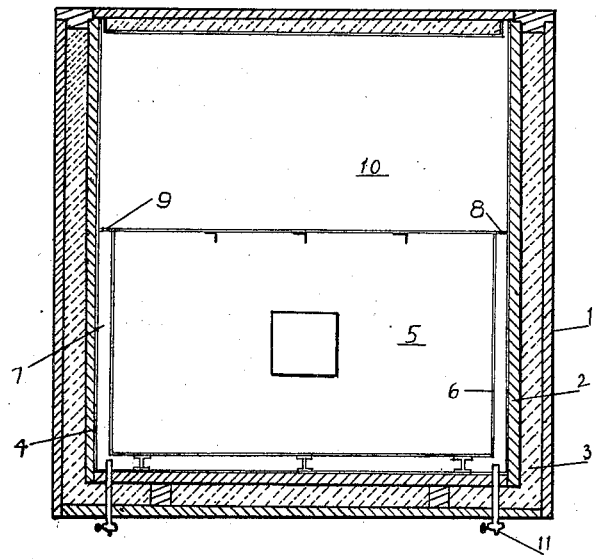
Figure 2:
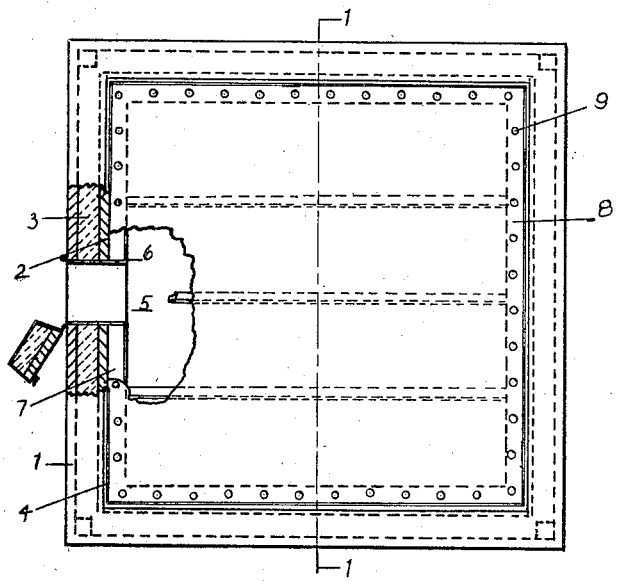

In the drawing of the herein described embodiment of my invention, Figure 1 shows a sectional view in elevation of a refrigerator suitable for my system of refrigeration. This view is taken through 1—1 of Fig. 2, which is a plan view with the cover removed and one side wall in section, to better show one entrance into the freezing chamber.

Similar numerals refer to similar parts throughout the several views.

1 is the outside shell. 2 is the inside shell, between which two shells is insulating material 3, such as cork or other suitable substance. 4 is a metal lining. 5 is the freezing chamber, the walls 6 of which are separated from metal lining 4, forming a space 7 in which the cooling brine or liquid may circulate. 8 is the top of this space 7, and is provided with openings or holes 9, which perform the function of straining the cooling liquid and separating it from the freezing mixture.

10 is the freezing mixture chamber, which may be filled with salt and ice properly mixed for freezing purposes. 11 is a drain cock at the bottom of space 7 for draining the refrigerator when desired.

The operation of my invention is as follows:

Broken ice and salt co-mingled, are placed in the chamber 10, and the brine from the melting of the same flows through openings 9 until space 7 is filled, then the brine covers the top of the freezing chamber and the freezing mixture and brine are brought together, when a gradual circulation takes place, the denser brine tending to go to the bottom of space 7.

Freezing mixture may be added in chamber 10 as desired, and the liquid may be drawn from drain 11, thus regulating the height of the liquid in freezing chamber 10, which determines, in a measure, the temperature obtained in the freezing chamber.

Having thus described my invention, what I claim and desire to secure by Letters Patent is—

1. A refrigerator, comprising a freezing chamber, a freezing mixture chamber above said freezing chamber, a space on the side of said freezing chamber in screened communication with said freezing mixture chamber, and means for regulating the height of brine resulting from the melting of the freezing mixture in said space and said freezing mixture chamber at a desired point above said freezing chamber.

2. In a refrigerator, a freezing chamber provided with a space on the side of said chamber within said refrigerator, a freezing mixture chamber above said freezing chamber the floor of which is provided with lateral extensions forming a screen over said space at the side of said freezing chamber whereby the solid refrigerant is retained and the melt therefrom is permitted to drain through and occupy said space at the side of said freezing chamber.

FRANCIS T. LYNCH.

Witnesses:
WALTER R. HEATH,
WILLIAM H. VARNEY.